(No Model.) 2 Sheets—Sheet 1.
W. PENDLEY & A. MOSS.
Wheel Cultivator.
No. 235,452. Patented Dec. 14, 1880.
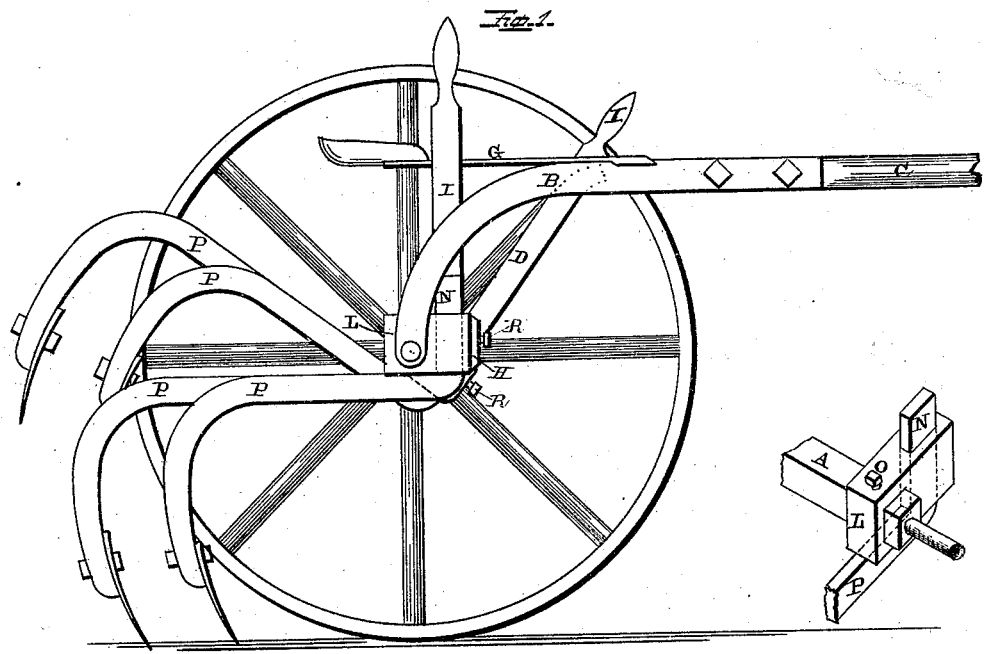
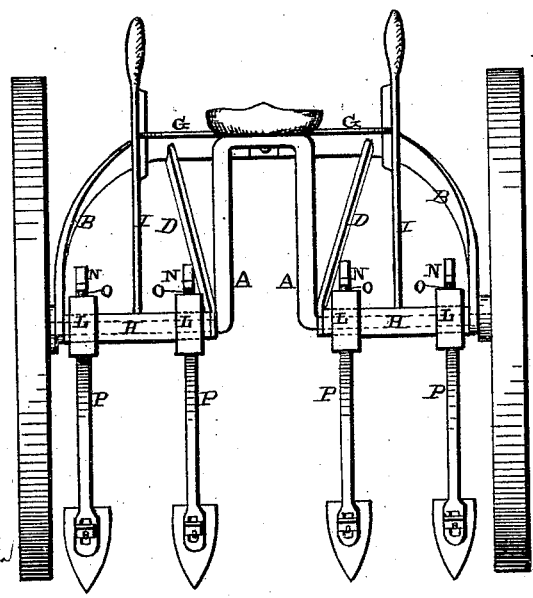
Witnesses
Inventors.
Wm. Pendley,
Anderson Moss,
per
F. A. Lehmann,
Atty.

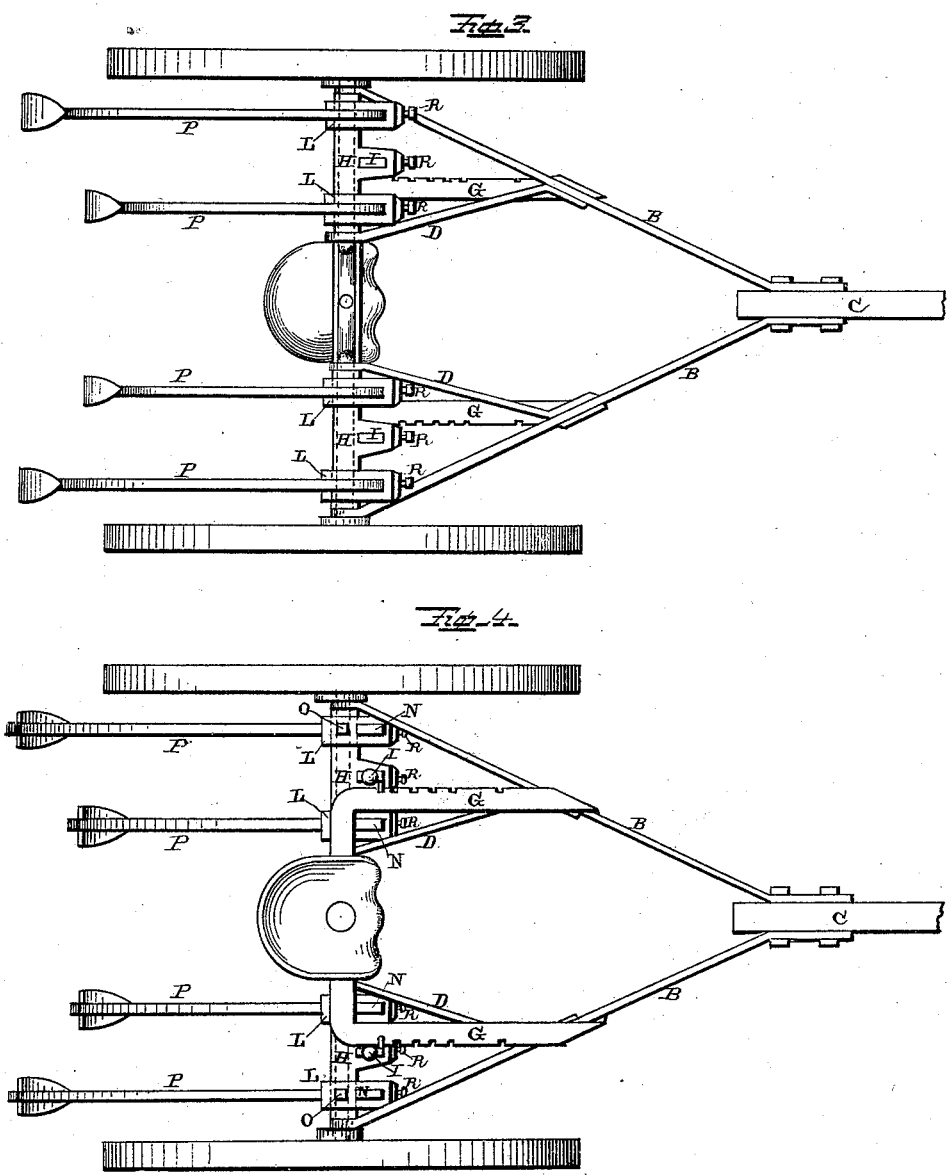

UNITED STATES PATENT OFFICE.

WILLIAM PENDLEY AND ANDERSON MOSS, OF LUDVILLE, GEORGIA.

WHEEL-CULTIVATOR.

SPECIFICATION forming part of Letters Patent No. 235,452, dated December 14, 1880.

Application filed September 13, 1880. (No model.)

*To all whom it may concern:*

Be it known that we, WM. PENDLEY and ANDERSON MOSS, of Ludville, in the county of Pickens and State of Georgia, have invented certain new and useful Improvements in Wheel-Cultivators; and we do hereby declare the following to be a full, clear, and exact description of the invention, such as will enable others skilled in the art to which it pertains to make and use it, reference being had to the accompanying drawings, which form part of this specification.

Our invention relates to an improvement in wheel-cultivators; and it consists in placing upon each side of the bend that is made in the center of the axle a suitable block in which the front turned-up ends of the cultivator-beams are rigidly clamped, and which blocks are provided with levers, by means of which they can be turned upon the axle for the purpose of raising and lowering the cultivators to and from the ground.

It further consists in a block which is placed upon the axle, and cultivator-beams which have their front ends turned vertically upward so as to pass through the blocks which are placed upon the axle, whereby the beams are adjusted vertically, so as to run deeper or shallower, as may be preferred.

The object of our invention is to provide a wheel-cultivator in which the cultivator-beams can be more readily and easily managed than has heretofore been the case, and whereby the beams can be adjusted vertically by means of set-screws alone.

Figure 1 is a side elevation of our invention with the near driving-wheel removed. Fig. 2 is a rear view of the same. Fig. 3 is an inverted view. Fig. 4 is a plan view.

A represents the axle, which is bent at the center, in the usual manner, so as to pass over the corn and other growing plants which are being cultivated. Secured to this axle at each end, just inside of the driving-wheels, are the two braces B, which have their front ends inclined toward each other, and the tongue C rigidly bolted between them; also, secured to the axle just outside of the bent portion, are the two braces D, which are inclined outward from their rear ends and have their front ends secured to the two braces B. These two braces are farther apart at their front than their rear ends, for the purpose of gathering in the tops of the plants and moving them inward so that they will pass under the bent portion of the axle, and thus enable the cultivator to be used in cultivating corn of larger growth than can be done where these diverging braces are not used.

Secured to the top of the two braces B and the portion of the axle is the seat-frame G, which frame has a series of notches in its outer edges for the operating-levers to catch in. Upon the end of the axle, in between the rear ends of the braces B and the two diverging braces D is placed a block, H, down through the front portion of which passes the lever I, which lever is made sufficiently elastic to always press against the side of the seat-frame, and is provided with flanges to catch in the notches in the edge of the frame, and thus hold the lever and the block, to which it is secured, in any position into which it may be adjusted. Upon each end of this block is placed a block, L, each one of which is adjustable laterally, and is secured in any desired position by means of the set-screws O. These blocks L have a vertical opening made through their front ends, and up through this vertical opening is passed the vertical end N of the beam P. The front end of each one of these beams, P, is turned upward, as shown, and the end N is made of such a length that the beam can be adjusted in relation to the earth so as to run deeper or shallower, as may be desired.

After each beam is secured in any desired position it is rigidly secured in place by means of a set-screw, R. As these blocks L are rigidly secured upon the block which turns upon the axle and has the lever secured to it, it is evident that when this block on the axle is turned the two blocks L, carrying the beams P, will be turned also. When the lever is moved forward to the last notch in the seat-frame the rear end of the two beams will be raised to such an extent above the earth that they will not touch it at all. Each block H has two cultivator-beams secured to it, and these beams can be adjusted laterally, so as to increase or decrease the distance between them, and of these two beams the two shorter ones are placed inside.

By securing the beam to the block which turns upon the axle the driver is enabled to manage the plows while sitting upon the seat with much more ease than he can do by having the front ends of the beams pivoted and their rear ends made to raise upward by means of the usual chains and levers. This construction not only enables the driver to control his machine more readily, but greatly cheapens the cost of the machine.

Having thus described our invention, we claim—

1. The combination of the beams P, having their ends turned vertically upward, with the blocks H L, and operating-lever, whereby the blocks are turned upon the axle, substantially as described.

2. The combination of the block H, placed upon the axle, and having operating-levers attached to them, with the blocks L passed over the ends of the blocks H and made laterally adjustable, substantially as set forth.

In testimony that we claim the foregoing we have hereunto set our hands this 30th day of August, 1880.

WILLIAM PENDLEY.
ANDERSON MOSS.

Witnesses:
GRANDISON MOSS,
MATERSON BRUCE.